Jan. 2, 1923.

W. S. SEARLES.
OPHTHALMIC MOUNTING.
FILED OCT. 11, 1919.

1,440,841.

Inventor
Wayne S. Searles.

By Howard E. Barlow
Attorney

Patented Jan. 2, 1923.

1,440,841

UNITED STATES PATENT OFFICE.

WAYNE S. SEARLES, OF PROVIDENCE, RHODE ISLAND, ASSIGNOR TO UNIVERSAL OPTICAL CORPORATION, OF PROVIDENCE, RHODE ISLAND, A CORPORATION OF RHODE ISLAND.

OPHTHALMIC MOUNTING.

Application filed October 11, 1919. Serial No. 329,965.

*To all whom it may concern:*

Be it known that I, WAYNE S. SEARLES, a citizen of the United States, and resident of the city of Providence, in the county of Providence and State of Rhode Island, have invented certain new and useful Improvements in Ophthalmic Mountings, of which the following is a specification.

This invention relates to ophthalmic mountings more particularly known as a finger-piece frame: and the object of this invention is to provide such a finger-piece frame comprising essentially a bridge member connecting the two opposite eye wires of the frame, the ends of the bridge being connected to the rear portion of the eye wires whereby a continuous annular non-metallic band may be readily applied to the outside of the eye wires, which is not the case with the usual finger piece frame of ordinary construction.

With these and other objects in view, the invention consists of certain novel features of construction, as will be more fully described, and particularly pointed out in the appended claim.

Figure 1:
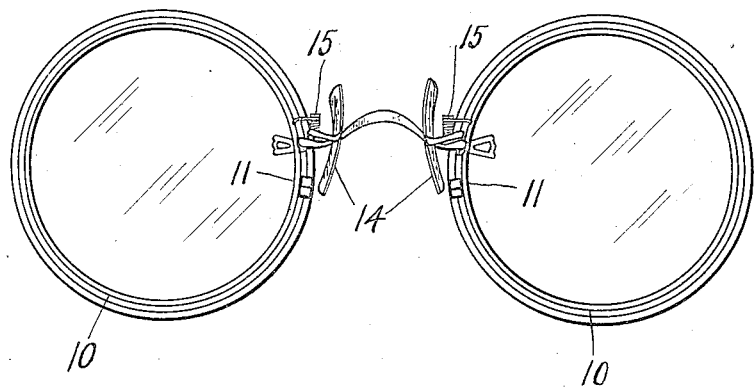

In the accompanying drawings:

Figure 1—is a rear view of my improved finger-piece frame.

Figure 2:
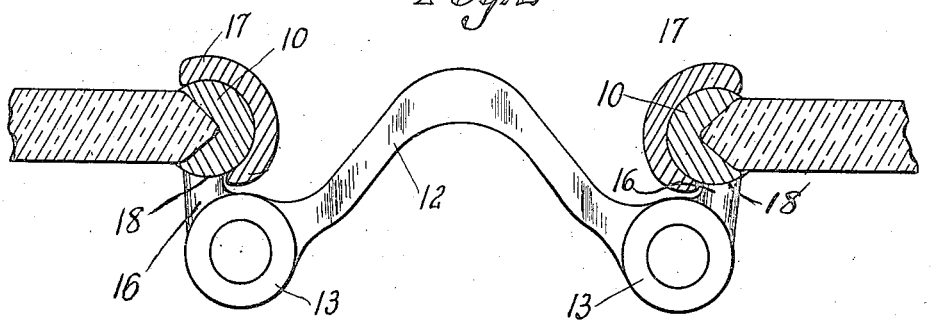

Figure 2—is a greatly enlarged view illustrating the general arrangement of the connection of the bridge member to the eye wire in such a manner as to permit the ready positioning of the non-metallic band over the eye wire.

Figure 3:
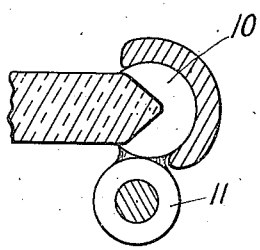

Figure 3 illustrates one of the eye-wire end pieces as being attached to the rear of the eye-wire so as not to interfere with the positioning of the non-metallic band over the eye-wire.

Referring to the drawings, 10 designates the eye wires of a finger-piece frame, the ends of which wires are joined together by end pieces 11 each set at the inner edge of the eye wire and at a point just below the point of attachment of the bridge member to the eye wire. These end pieces are connected to the rear of the eye wire so as to offer the minimum amount of interference to the positioning of the non-metallic rim thereover.

The bridge member 12 of this finger-piece frame is provided with the usual enlarged portions 13 on which the usual nose grip members 14 are pivotally mounted by the screws 15, and in order to also offer the minimum amount of interference to the positioning of the non-metallic rim over the eye wire, I connect these enlarged portions 13 at the end of the bridge to the rear portion 14 of the eye wire, that is, to the rear of a medial line through the lens-receiving grooves in said eye wires, and in some cases I provide a short neck member 16 to lift the end of the bridge member out slightly from the wire, so as not to interfere with the inner edge of the non-metallic rim 17 when positioned thereover. By this construction and arrangement of attaching the bridge member to the eye wire I not only permit the ready positioning of the non-metallic rim thereover, but I also at the same time reduce the pupillary distance between the lenses which in many cases is of importance.

The non-metallic rims 17 are preferably formed of celluloid or zylonite but may be formed of other suitable material which is internally grooved forming a continuous band which may be readily sprung and snapped over the eye wire and retained thereon without fastening other than their own resiliency.

By my improved construction I am enabled to use a continuous non-metallic rim on a finger piece frame, which construction renders such a frame very neat and attractive in appearance.

The foregoing description is directed solely towards the construction illustrated, but I desire it to be understood that 1 reserve the privilege of resorting to all the mechanical changes to which the device is susceptible, the invention being defined and limited only by the terms of the appended claim.

I claim:

In an ophthalmic mounting a finger piece frame having eye-wires, a pivoting enlargement connected to and extending a substantial distance rearwardly from each of said eyewires, a bridge member having its ends connected to the forward sides of said enlargements, and finger operated grips pivotally mounted on said enlargements.

In testimony whereof I affix my signature.

WAYNE S. SEARLES.